US012617263B2

(12) United States Patent (10) Patent No.: US 12,617,263 B2
Mikuni et al. (45) Date of Patent: May 5, 2026

(54) VEHICLE

(71) Applicant: TOYOTA JIDOSHA KABUSHIKI KAISHA, Toyota (JP)

(72) Inventors: Atsushi Mikuni, Toyota (JP); Shintaro Kitakata, Nisshin (JP); Reiji Iwaihara, Toyota (JP); Takumi Kawata, Okazaki (JP); Norihisa Nomura, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 18/538,243

(22) Filed: Dec. 13, 2023

(65) Prior Publication Data

US 2024/0208319 A1    Jun. 27, 2024

(30) Foreign Application Priority Data

Dec. 27, 2022    (JP) ................................. 2022-210092

(51) Int. Cl.
B60K 1/04        (2019.01)
B60L 50/64        (2019.01)

(52) U.S. Cl.
CPC ............... B60K 1/04 (2013.01); B60L 50/64 (2019.02); *B60K 2001/0438* (2013.01); *B60K 2001/0455* (2013.01)

(58) Field of Classification Search
CPC .............. B60K 1/04; B60K 2001/0438; B60K 2001/0455; B60K 2001/0472; B60L 50/64; B60L 50/66; B60L 53/80; F16F 15/04
See application file for complete search history.

(56) References Cited

U.S. PATENT DOCUMENTS 5,998,963 A * 12/1999 Aarseth ................... B60L 50/64
                                                                320/109
2012/0111654 A1* 5/2012 Origuchi ................. B60L 53/80
                                                                180/68.5
2018/0154789 A1   6/2018 Janku
2021/0261017 A1   8/2021 Uiterloo

FOREIGN PATENT DOCUMENTS

FR            2946593 A1 * 12/2010   ............ H01M 50/20
JP         2011098644 A  *  5/2011   ............. B60L 50/64
JP         2011168127 A  *  9/2011   ............. B60L 53/80
JP         2012-192782 A    10/2012
JP         2018-518421 A     7/2018
WO   WO-2010033881 A1 *  3/2010   ............. B60L 50/66

* cited by examiner

*Primary Examiner* — Hung Q Nguyen
(74) *Attorney, Agent, or Firm* — Dinsmore & Shohl LLP

(57)        ABSTRACT
A vehicle includes: a vehicle body including a mounting portion which opens downward and in which a battery is mountable; and the battery attachable to and detachable from the mounting portion, from below the mounting portion. At least one of the battery and the mounting portion has a tapered portion having a shape that gradually expands downward.

3 Claims, 4 Drawing Sheets

VEHICLE INFORMATION
BATTERY INFORMATION

VEHICLE

CROSS-REFERENCE TO RELATED APPLICATIONS

This nonprovisional application is based on Japanese Patent Application No. 2022-210092 filed on Dec. 27, 2022 with the Japan Patent Office, the entire contents of which are hereby incorporated by reference.

BACKGROUND

Field

The present disclosure relates to a vehicle.

Description of the Background Art

Conventionally, a vehicle in which a battery can be replaced is known. For example, Japanese Patent Laying-Open No. 2012-192782 discloses a battery replacement apparatus capable of replacing a battery attached to a lower portion of a vehicle body, from below the vehicle body.

SUMMARY

In the battery replacement apparatus described in Japanese Patent Laying-Open No. 2012-192782, when a battery is to be connected to a vehicle body and the position of a battery-side connector deviates from the position of a vehicle body-side connector, the battery cannot be connected to the vehicle body.

It is an object of the present disclosure to provide a vehicle in which occurrence of a failure in connecting the battery-side connector to the vehicle body-side connector can be suppressed.

According to an aspect of the present disclosure, a vehicle includes: a vehicle body including a mounting portion which opens downward and in which a battery is mountable; and the battery attachable to and detachable from the mounting portion, from below the mounting portion, wherein the battery has a battery-side connector, the vehicle body has a vehicle body-side connector electrically connectable to the battery-side connector, and at least one of the battery-side connector and the vehicle body-side connector has a tapered portion having a shape that gradually expands downward.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figures 1, 2:
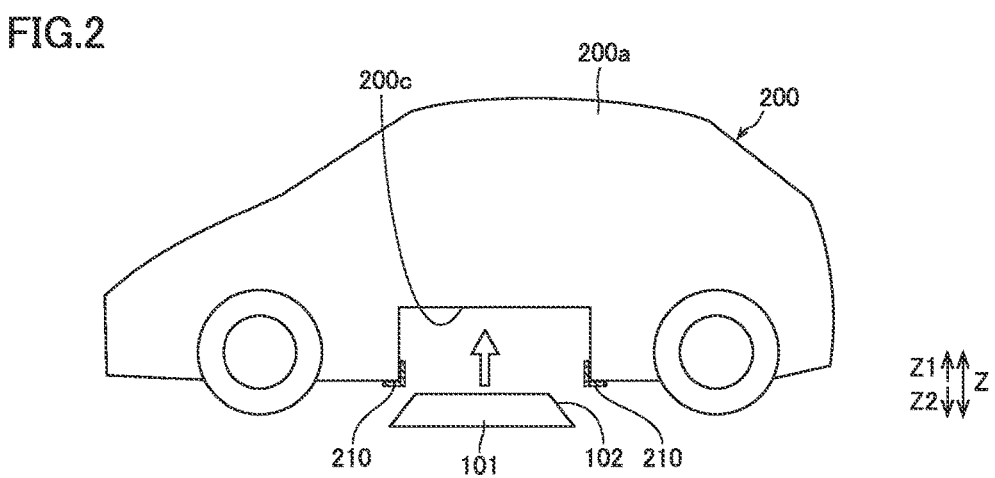
FIG. 1 schematically shows a battery replacement apparatus according to an embodiment of the present disclosure.
FIG. 2 is a diagram schematically showing a state before a battery is connected to a vehicle body.

Hereinafter, embodiments of the present disclosure will be described in detail with reference to the accompanying drawings. In the drawings, the same or corresponding parts are denoted by the same reference numerals, and the description thereof will not be repeated.

FIG. 1 is a diagram showing a battery replacement apparatus 100 and an electrically powered vehicle 200 according to the present embodiment. The battery replacement apparatus 100 is an apparatus for replacing a battery (used battery) 201 attached to the electrically powered vehicle 200 with a charged battery (new battery) 101. The battery 201 and the battery 101 are examples of "first battery" and "second battery" of the present disclosure, respectively.

(Configuration of Electrically Powered Vehicle)

As shown in FIG. 1, the vehicle body 200a of the electrically powered vehicle 200 has a mounting portion 200c on which the batteries 101 and 201 can be mounted. The mounting portion 200c opens downward. The mounting portion 200c has a shape recessed upward from the lower surface 200b of the vehicle body 200a. The batteries 101 and 201 are attachable to and detachable from the mounting portion 200c. Specifically, the batteries 101 and 201 are fastened to the mounting portion 200c by fastening members such as bolts.

Figure 3:
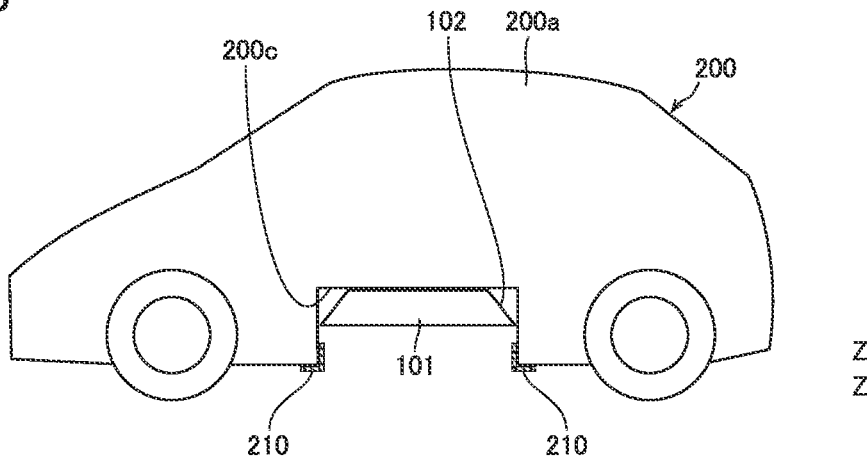
FIG. 3 is a diagram schematically showing a state after a battery is connected to a vehicle body.

Next, the configuration of the battery and the mounting portion 200c will be described with reference to FIGS. 2 and 3. Hereinafter, the charged battery 101 will be described as an example.

As shown in FIG. 2, the battery 101 has a tapered portion 102. The tapered portion 102 has a shape that gradually expands downward. The tapered portion 102 is contiguous to the upper surface of the battery 101. The tapered portion 102 may be formed in an annular shape. The length of the tapered portion 102 in the width direction (Y direction) of the vehicle may be longer than the length of the tapered portion 102 in the front-rear direction (X direction).

The mounting portion 200c includes a cushioning portion 210. The cushioning portion 210 is provided on a part of the vehicle body 200a that face the tapered portion 102 when the battery 101 is connected to the mounting portion 200c. The cushioning portion 210 is composed of a ball bearing, a sponge, or the like. The cushioning portion 210 may be provided on the tapered portion 102.

(Configuration of Battery Replacement Apparatus)

Next, the battery replacement apparatus 100 will be described. As shown in FIG. 1, the battery replacement apparatus 100 includes a battery replacement station 100a, a storage 100b, and an underfloor area 100c.

The battery replacement station 100a is a station in which the battery 201 is detached from the electrically powered vehicle 200 and the battery 101 is attached to the electrically powered vehicle 200. The battery replacement station 100a is provided with an entrance/exit a1 for the electrically powered vehicle 200 to enter/exit.

The storage 100b stores the charged battery 101. The storage 100b is provided in parallel with the battery replacement station 100a. A charging facility 51 capable of charging the battery 201 removed from the electrically powered vehicle 200 is provided in the storage 100b. The battery 201 is charged by the charging facility 51 in the storage 100b. The battery 101 charged in the storage 100b, that is, the charged battery 101 is moved to a temporary placement site 40 provided in the underfloor area 100c, and then conveyed to the electrically powered vehicle 200.

The underfloor area 100c is provided below the battery replacement station 100a and the storage 100b. The underfloor area 100c is provided with a battery mounting table 34, a transport unit 36, and the temporary placement site 40, which will be described later.

The battery replacement apparatus 100 includes a control device 10 and a drive device 30.

The control device 10 includes a processor 11, a memory 12, and a communication unit 13. The memory 12 stores, in addition to a program executed by the processor 11, information (e.g., map, formula, and various parameters) used by the program. As will be described in detail later, the processor 11 controls the drive device 30.

The communication unit 13 includes various communication I/Fs. The processor 11 controls the communication unit 13. The communication unit 13 communicates with a DCM or the like of the electrically powered vehicle 200. The communication unit 13 and the electrically powered vehicle 200 can perform bidirectional communication. The communication unit 13 may communicate with a mobile terminal or the like possessed by the user of the electrically powered vehicle 200.

The battery replacement station 100a is provided with a vehicle stop area (not shown). When the user performs an operation for instructing the start of the battery replacement operation in a navigation system (not shown) of the electrically powered vehicle 200 in a state where the electrically powered vehicle 200 is stopped in the vehicle stop area, the communication unit 13 receives an instruction signal for starting the battery replacement operation from the electrically powered vehicle 200. The processor 11 starts the control of the battery replacement operation based on the reception of the instruction signal by the communication unit 13. The electrically powered vehicle 200 stops in the vehicle stop area such that the front-rear direction is the X direction and the left-right direction is the Y direction.

The drive device 30 includes a shutter 32, a battery mounting table 34, and a transport unit 36.

The shutter 32 is provided in the vehicle stop area. The shutter 32 is configured to be able to open and close an opening formed in a floor surface of the vehicle stop area. The shutter 32 can be switched between a state in which the opening is opened and a state in which the opening is closed.

The battery mounting table 34 is disposed below the battery replacement station 100a, more specifically, below the opening of the shutter 32. The battery mounting table 34 can mount the batteries 101 and 201 and can move in the vertical direction.

The transport unit 36 transports the battery 101 stored in the storage 100b toward the battery mounting table 34. Specifically, in the underfloor area 100c, a temporary placement site 40 for temporarily placing the charged battery 101 stored in the storage 100b is provided, and the transport unit 36 can transport the battery 101 from the temporary placement site 40 toward the battery mounting table 34. The transport unit 36 may be of a belt conveyor type, for example.

(Battery Replacement Method)

Next, a battery replacement method using the battery replacement apparatus 100 will be described.

[Transmit Vehicle Information and the Like: Electrically Powered Vehicle]

First, the electrically powered vehicle 200 transmits information about the electrically powered vehicle 200 and information about the battery 201 to the communication unit 13 of the battery replacement apparatus 100. For example, when an operation of transmitting the above information is performed in a navigation system (not shown) of the electrically powered vehicle 200, the above information is transmitted to the communication unit 13. The electrically powered vehicle 200 transmits the above information before entering the battery replacement apparatus 100. The above information may be transmitted after the electrically powered vehicle 200 has entered the battery replacement apparatus 100.

[Acquire Vehicle Information and the Like: Battery Replacement Apparatus]

Next, the communication unit 13 of the battery replacement apparatus 100 acquires information on the electrically powered vehicle 200 and information on the battery 201 transmitted from the electrically powered vehicle 200 by communication. The acquired information is stored in the memory 12 (see FIG. 1).

The communication unit 13 may also acquire information on the capacity (charge capacity) of the battery 201 and the SOC (State Of Charge) of the battery 201.

[Transmit Instruction Signal for Battery Replacement Operation: Electrically Powered Vehicle]

Next, the electrically powered vehicle 200 stopped in the vehicle stop area transmits an instruction signal for starting the battery replacement operation to the communication unit 13.

[Receive Instruction Signal for Battery Replacement Operation: Battery Replacement Apparatus]

Next, the communication unit 13 receives the instruction signal transmitted from the electrically powered vehicle 200. After receiving the instruction signal, the processor 11 may transmit an instruction message or the like for turning off the ignition power supply to the user of the electrically powered vehicle 200 through the communication unit 13.

[Control Vehicle Position: Battery Replacement Apparatus]

Next, the processor 11 adjusts the position of the electrically powered vehicle 200 based on the information (vehicle information and battery information) acquired through the communication unit 13.

Thus, the position and orientation of the vehicle body 200a in the horizontal direction are adjusted, and the position and orientation of the battery 201 in the horizontal direction are adjusted. As a result, the battery 201 is moved to a predetermined position above the opening of the shutter 32.

[Detach Battery after Use: Battery Replacement Apparatus]

Next, the battery 201 after use is detached from the vehicle body 200a of the electrically powered vehicle 200. First, the processor 11 opens the shutter 32 and raises the battery mounting table 34. As a result, the battery mounting table 34 is positioned with respect to the electrically powered vehicle 200 (battery 201).

Next, the processor 11 drives (rotates) a locking/unlocking tool (not shown) for rotating a fastening member for connecting the battery to the mounting portion 200c. Thereby, the fastening member is unlocked. As a result, the battery 201 is detached from the vehicle body 200a and mounted on the battery mounting table 34.

[Transport Battery After Use to Storage: Battery Replacement Apparatus]

Next, the battery 201 removed from the vehicle body 200a is conveyed to the storage 100b. First, the processor 11 lowers the battery mounting table 34 on which the battery 201 is mounted to the height position of the transport unit 36. Subsequently, the processor 11 drives a roller portion (not shown) of the battery mounting table 34 so that the battery 201 moves in the storage direction (Y1 direction) on the battery mounting table 34. Thus, the battery 201 mounted on the battery mounting table 34 moves from the battery mounting table 34 to the transport unit 36. The battery 201 is transported to the temporary placement site 40 by the transport unit 36, and then stored in the storage 100b. The used battery 201 stored in the storage 100b is charged by the charging facility 51.

[Transport Charged Battery to Battery Mounting Table: Battery Replacement Apparatus]

Next, the processor 11 conveys the charged battery 101 stored in the storage 100b to the battery mounting table 34. Specifically, after the processor 11 conveys the battery 101 from the storage 100b to the temporary placement site 40 in the underfloor area 100c, the processor 11 moves the battery 101 from the temporary placement site 40 to the battery mounting table 34 by driving the transport unit 36 in the transport direction (Y2 direction). When the battery 101 moves from the transport unit 36 to the battery mounting table 34, the processor 11 drives the roller portion so that the battery 101 moves on the battery mounting table 34 along the transport direction. As a result, the battery 101 stops at a predetermined position on the battery mounting table 34.

[Attach Charged Battery: Battery Replacement Apparatus]

Next, the processor 11 performs control for attaching the charged battery 101 to the vehicle body 200a. Specifically, the processor 11 raises the battery mounting table 34. At this time, even if the position of the battery 101 deviates from the regular connection position with respect to the position of the mounting portion 200c as shown in FIG. 2, the battery 101 is guided to the regular connection position with the tapered portion 102 sliding upward with respect to the lower end of the mounting portion 200c. Therefore, as shown in FIG. 3, the battery 101 is effectively connected to the mounting portion 200c. In this state, the processor 11 drives (rotates) the locking/unlocking tool. Thereby, the fastening member is locked. When it is detected that all the fastening members are locked, the mounting portion 200c and the battery 101 are locked. As a result, the attachment of the charged battery 101 to the vehicle body 200a is completed.

[Retract Battery Mounting Table and Raising/Lowering Unit: Battery Replacement Apparatus]

Next, the processor 11 lowers the battery mounting table 34 and retracts the battery mounting table 34 from the electrically powered vehicle 200. Thereafter, the processor 11 closes the shutter 32.

[Notification of Completion of Battery Replacement Operation: Battery Replacement Apparatus]

Next, the processor 11 notifies the electrically powered vehicle 200 of the completion of the battery replacement operation through the communication unit 13.

[Receive the Battery Replacement Operation Completion Notification: Electrically Powered Vehicle]

Then, the electrically powered vehicle 200 receives the notification transmitted from the communication unit 13 of the battery replacement apparatus 100. Thus, the electrically powered vehicle 200 is brought into a state in which the ignition power supply can be turned on. Thereafter, the process ends.

In the above embodiment, the position of the drive device 30 is adjusted based on the information about each of the electrically powered vehicle 200 and the battery 201, but the present disclosure is not limited thereto. The position of the drive device 30 may be adjusted based on information about either the electrically powered vehicle 200 or the battery 201.

As described above, in the electrically powered vehicle 200 according to the present embodiment, the battery 101 has the tapered portion 102, and therefore, even if the position of the battery 101 deviates from the regular connection position with respect to the position of the mounting portion 200c when the battery 101 is connected to the mounting portion 200c, the battery 101 is guided to the regular connection position with respect to the mounting portion 200c by the guide of the tapered portion 102. Therefore, the occurrence of a connection failure of the battery 101 to the vehicle body 200a is suppressed.

Figure 4:
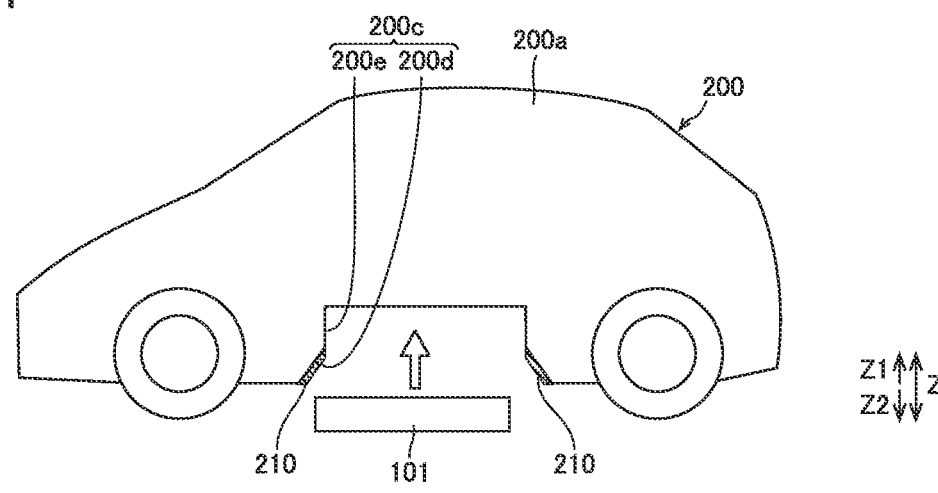
FIG. 4 is a cross-sectional view schematically showing a state before connection, in a modification of a mounting portion and the battery.
Figure 5:
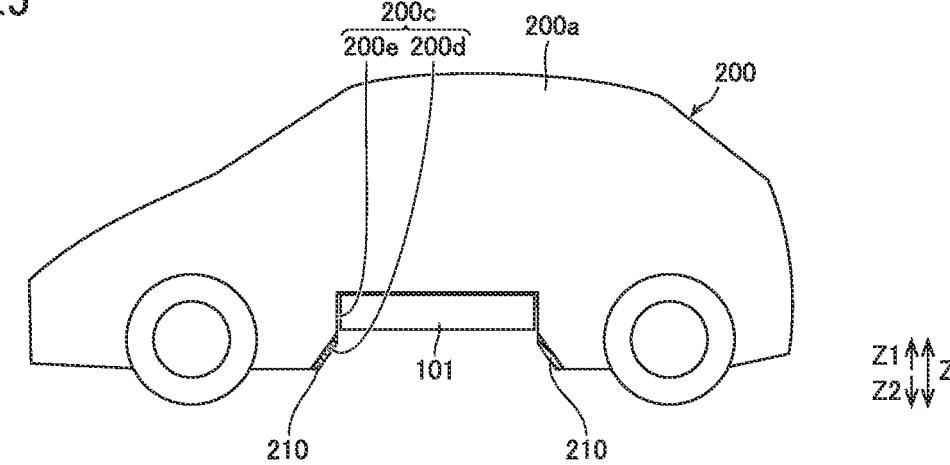
FIG. 5 is a cross-sectional view schematically showing a state after connection, in a modification of the mounting portion and the battery.

In the above embodiment, as shown in FIGS. 4 and 5, the mounting portion 200c may have a tapered portion 200d. In this example, the mounting portion 200c includes a tapered portion 200d and a receiving portion 200e. The receiving portion 200e has a shape extending upward from the upper end of the tapered portion 200d. The receiving portion 200e is a portion for receiving the battery 101.

In the example shown in FIGS. 4 and 5, the cushioning portion 210 is provided on the tapered portion 200d. However, the cushioning portion 210 may be provided on a part of the battery 101 facing the tapered portion 200d when the battery 101 is connected to the mounting portion 200c.

Figure 6:
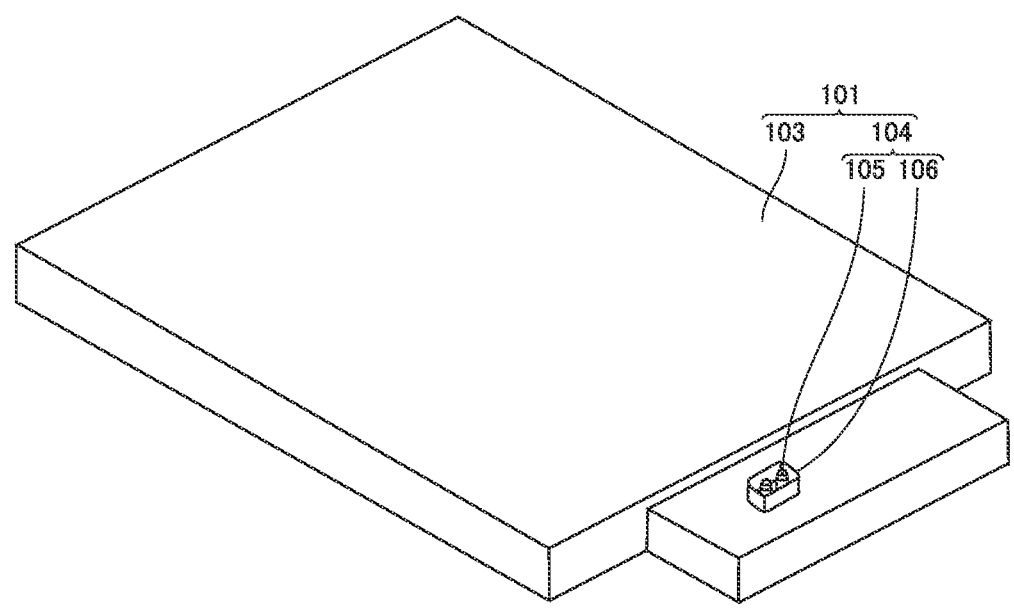
FIG. 6 is a perspective view schematically showing a configuration of a battery.
Figure 7:
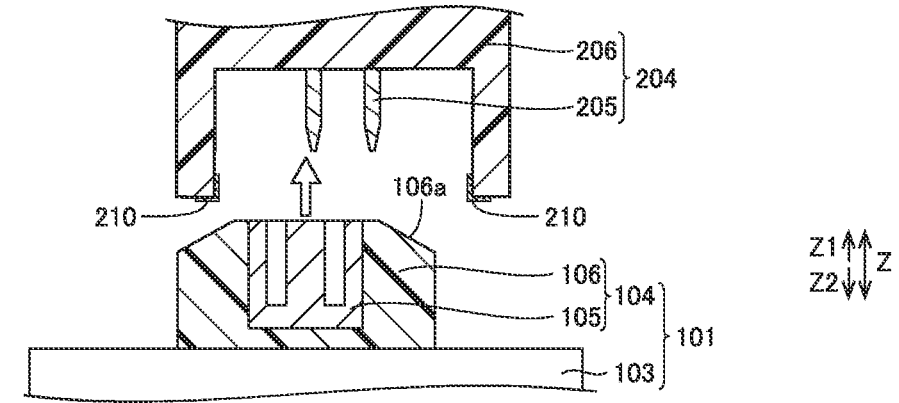
FIG. 7 is a cross-sectional view schematically showing a state before the battery-side connector and the vehicle body-side connector are connected.
Figure 8:
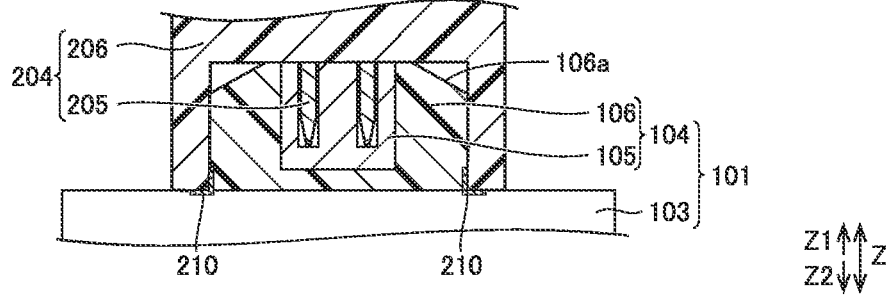
FIG. 8 is a cross-sectional view schematically showing a state after connection of the battery-side connector and the vehicle body-side connector.

The technical idea of providing the tapered portion can be applied to the battery-side connector 104 (see FIG. 6) and the vehicle body-side connector 204 (see FIG. 7). Specifically, the configuration of the battery will be described with reference to FIGS. 6 to 8. Hereinafter, the charged battery 101 will be described as an example. As shown in FIG. 6, the battery 101 includes a battery body 103 and a battery-side connector 104. The battery body 103 may be provided with the tapered portion 102.

The battery-side connector 104 projects upward from the battery body 103. The battery-side connector 104 can be connected to the vehicle body-side connector 204 (see FIGS. 7 and 8). The battery-side connector 104 includes a terminal 105 and a housing 106.

In the present embodiment, the terminal 105 is formed of a female terminal.

The housing 106 holds the terminal 105. The housing 106 is made of synthetic resin or the like. The housing 106 has a tapered portion 106a having a shape that gradually expands downward. The tapered portion 106a is contiguous to the upper surface of the housing 106. The tapered portion 106a may be formed in an annular shape. The length of the tapered portion 106a in the width direction (Y direction) of the vehicle may be longer than the length of the tapered portion 106a in the front-rear direction (X direction).

The mounting portion 200c is provided with a vehicle body-side connector 204 that can be electrically connected to the battery-side connector 104. The vehicle body-side connector 204 includes a terminal 205 and a housing 206.

In the present embodiment, the terminal 205 is formed of a male terminal.

The housing 206 holds the terminal 205. The housing 206 is made of synthetic resin or the like.

The vehicle body-side connector 204 includes a cushioning portion 210. The cushioning portion 210 is provided on a part of the housing 206 that faces the tapered portion 106*a* when the battery-side connector 104 is connected to the vehicle body-side connector 204. The cushioning portion 210 is composed of a ball bearing, a sponge, or the like. The cushioning portion 210 may be provided on the tapered portion 106*a*.

Figures 9, 10:
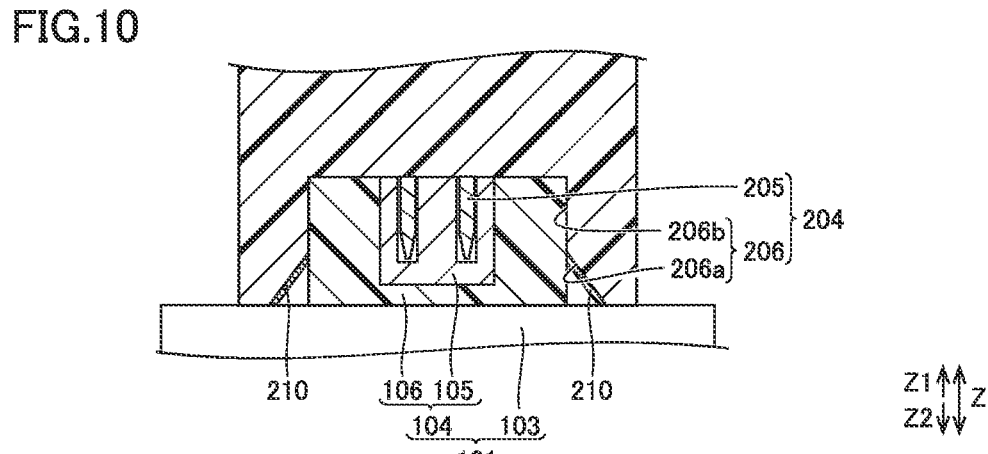
FIG. 9 is a cross-sectional view schematically showing a state before connection, in a modification of the battery-side connector and the vehicle body-side connector.
FIG. 10 is a cross-sectional view schematically showing a state after connection, in a modification of the battery-side connector and the vehicle body-side connector.

Alternatively, as shown in FIGS. 9 and 10, the housing 206 may have a tapered portion 206*a*. In this example, the housing 206 of the vehicle body-side connector 204 includes a tapered portion 206*a* and a receiving portion 206*b*. The receiving portion 206*b* has a shape extending upward from the upper end of the tapered portion 206*a*. The receiving portion 206*b* is a portion for receiving the battery-side connector 104.

In the example shown in FIGS. 9 and 10, the cushioning portion 210 is provided on the tapered portion 206*a*. However, the cushioning portion 210 may be provided on a part of the housing 106 of the battery-side connector 104 that faces the tapered portion 206*a*.

It will be appreciated by those skilled in the art that the exemplary embodiments described above are specific examples of the aspects described below.

[Aspect 1]

A vehicle including:

a vehicle body including a mounting portion which opens downward and in which a battery is mountable; and the battery attachable to and detachable from the mounting portion, from below the mounting portion, wherein at least one of the battery and the mounting portion has a tapered portion having a shape that gradually expands downward.

In this vehicle, at least one of the battery and the mounting portion has the tapered portion, and therefore, even if the position of the battery deviates from the regular connection position with respect to the position of the mounting portion when the battery is connected to the mounting portion, the battery is guided to the regular connection position with respect to the mounting portion by the guide of the tapered portion. Therefore, occurrence of a failure in connecting the battery to the vehicle body is suppressed.

[Aspect 2]

The vehicle according to Aspect 1, further including a cushioning portion provided on the tapered portion or provided on a part of the battery or the vehicle body that faces the tapered portion when the battery is connected to the mounting portion.

In this aspect, wear of both the tapered portion and the part facing the tapered portion is suppressed when they rub against each other.

[Aspect 3]

The vehicle according to Aspect 1 or 2, wherein the mounting portion includes:

the tapered portion; and a receiving portion that has a shape extending upward from an upper end of the tapered portion and receives the battery.

In this aspect, when the battery is connected to the mounting portion, the battery is connected to the receiving portion after being guided in the horizontal direction by the tapered portion, and therefore, occurrence of a connection failure caused by the battery being connected in an inclined posture with respect to the mounting portion is suppressed.

[Aspect 4]

A vehicle including:

a vehicle body including a mounting portion which opens downward and in which a battery is mountable; and the battery attachable to and detachable from the mounting portion, from below the mounting portion, wherein the battery includes a battery-side connector, the vehicle body includes a vehicle body-side connector electrically connectable to the battery-side connector, and at least one of the battery-side connector and the vehicle body-side connector has a tapered portion having a shape that gradually expands downward.

In this vehicle, at least one of the battery-side connector and the vehicle body-side connector has the tapered portion, and therefore, even if the position of the battery-side connector deviates from the regular connection position with respect to the position of the vehicle body-side connector when the battery-side connector is connected to the vehicle body-side connector, the battery-side connector is guided to the regular connection position with respect to the vehicle body-side connector by the guide of the tapered portion. Therefore, occurrence of connection failure of the battery-side connector to the vehicle body-side connector is suppressed.

[Aspect 5]

The vehicle according to Aspect 4, further including a cushioning portion provided on the tapered portion or provided on a part of the battery-side connector or the vehicle body-side connector that faces the tapered portion when the battery-side connector is connected to the vehicle body-side connector.

In this aspect, wear of both the tapered portion and the part facing the tapered portion is suppressed when they rub against each other.

[Aspect 6]

The vehicle according to Aspect 4 or 5, wherein the battery-side connector includes:

the tapered portion; and a receiving portion that has a shape extending upward from an upper end of the tapered portion and receives the battery-side connector.

In this aspect, when the battery-side connector is connected to the vehicle body-side connector, the battery-side connector is connected to the receiving portion after being guided in the horizontal direction by the tapered portion, and therefore, occurrence of a connection failure caused by the battery-side connector connected in an inclined posture with respect to the vehicle body-side connector is suppressed.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:

a vehicle body including a mounting portion which opens downward and in which a battery is mountable; and the battery attachable to and detachable from the mounting portion, from below the mounting portion, wherein:

at least one of the battery and the mounting portion has a tapered portion having a shape that gradually expands downward;

the battery includes a battery body and a battery-side connector that projects upward from the battery body;

the mounting portion is provided with a vehicle body-side connector that is configured to be electrically connected to the battery-side connector;

the battery-side connector and the vehicle body-side connector each have a terminal and a housing that holds the terminal;

the housing of the battery-side connector has a housing tapered portion having a shape that gradually expands downward and is formed in an annular shape; and a length of the housing tapered portion in a width direction of the vehicle body is longer than a length of the housing tapered portion in a front-rear direction of the vehicle body.

2. The vehicle according to claim 1, further comprising a cushioning portion provided on the housing tapered portion.

3. The vehicle according to claim 1, wherein a length of the tapered portion in the width direction is longer than a length of the tapered portion in the front-to-rear direction.

* * * * *